United States Patent
Kalra et al.

(10) Patent No.: US 12,225,159 B2
(45) Date of Patent: Feb. 11, 2025

(54) TECHNOLOGIES FOR ADAPTIVE PREDICTIVE ROUTING IN CONTACT CENTER SYSTEMS

(71) Applicant: Genesys Cloud Services, Inc., Menlo Park, CA (US)

(72) Inventors: Manan Kalra, Galway (IE); Gergely Toth, Galway (IE); David Farrell, Galway (IE); Emir Munoz, Galway (IE)

(73) Assignee: Genesys Cloud Services, Inc., Menlo Park, CA (US)

( * ) Notice: Subject to any disclaimer, the term of this patent is extended or adjusted under 35 U.S.C. 154(b) by 0 days.

(21) Appl. No.: 18/104,088

(22) Filed: Jan. 31, 2023

(65) Prior Publication Data

US 2024/0259497 A1     Aug. 1, 2024

(51) Int. Cl.
*H04M 3/523*     (2006.01)

(52) U.S. Cl.
CPC ....... *H04M 3/5233* (2013.01); *H04M 3/5236* (2013.01); *H04M 3/5238* (2013.01)

(58) Field of Classification Search
CPC ...... H04M 3/51; H04M 3/523; H04M 3/5233; H04M 3/5236; H04M 3/5232; H04M 2203/402
USPC ........................................ 379/265.11, 265.14
See application file for complete search history.

(56) References Cited

U.S. PATENT DOCUMENTS

| | | | |
|---|---|---|---|
| 2009/0304172 A1 | 12/2009 | Becerra et al. | |
| 2017/0149976 A1* | 5/2017 | Conway | H04M 3/5235 |
| 2021/0136222 A1* | 5/2021 | Brown | G06N 5/045 |
| 2022/0006709 A1 | 1/2022 | Deval et al. | |
| 2022/0360669 A1 | 11/2022 | Munoz et al. | |

FOREIGN PATENT DOCUMENTS

EP     2338270 B1     4/2018

OTHER PUBLICATIONS

Wikipedia; Kernel density estimation; available at https://en.wikipedia.org/wiki/Kernel_density_estimation; last accessed Jan. 31, 2023; 11 pages.

Stack Exchange Inc; How to interpret the bandwidth value in a kernel density estimation?; Cross Validated; available at https://stats.stackexchange.com/questions/226232/how-to-interpret-the-bandwidth-value-in-a-kernel-density-estimation/226239#226239; last accessed Jan. 31, 2023; 4 pages.

(Continued)

*Primary Examiner* — Harry S Hong
(74) *Attorney, Agent, or Firm* — Taft Stettinius & Hollister LLP

(57) ABSTRACT

A method for adaptive predictive routing in a contact center system according to an embodiment includes identifying an interaction to be routed to a contact center agent, determining, for each agent cohort of a plurality of agent cohorts in sequential order and for a cohort time period associated with the respective agent cohort, whether a contact center agent within the respective cohort is available to be routed the interaction, wherein the plurality of agent cohorts is in sequential order based on descending agent performance scores for at least one key performance indicator, and routing the interaction to a first contact center agent determined to be available to be routed the interaction.

8 Claims, 9 Drawing Sheets

(56) References Cited

OTHER PUBLICATIONS

The Scipy Community; scipy.integrate.quad; available at https://docs.scipy.org/doc/scipy/reference/generated/scipy.integrate.quad.html; last accessed Jan. 31, 2023; 6 pages.
Erdogan Taskesen; Distfit; available at https://erdogant.github.io/distfit/pages/html/index.html; last accessed Jan. 31, 2023; 6 pages.
Stack Exchange Inc; Fitting empirical distribution to theoretical ones with Scipy (Python)?; Stack Overflow; available at https://stackoverflow.com/questions/6620471/fitting-empirical-distribution-to-theoretical-ones-with-scipy-python?lq=1; last accessed Jan. 31, 2023; 33 pages.
International Search Report and Written Opinion of the International Searching Authority; European Patent Office; International Application No. PCT/US2024/013537; Sep. 25, 2024; 17 pages.

\* cited by examiner

TECHNOLOGIES FOR ADAPTIVE PREDICTIVE ROUTING IN CONTACT CENTER SYSTEMS

BACKGROUND

Call centers and other contact centers are used by many organizations to provide technical and other support to their end users. The end user may interact with human and/or virtual agents of the contact center by establishing electronic communications via one or more communication technologies including, for example, telephone, email, web chat, Short Message Service (SMS), dedicated software application(s), and/or other technologies. Contact centers may have a substantial number of agents in order to efficiently respond to end user queries and, therefore, contact centers use some mechanism to route communications or interactions to an appropriate agent

SUMMARY

One embodiment is directed to a unique system, components, and methods for adaptive predictive routing in a contact center system. Other embodiments are directed to apparatuses, systems, devices, hardware, methods, and combinations thereof for adaptive predictive routing in a contact center system.

According to an embodiment, a method for adaptive predictive routing in a contact center system may include identifying an interaction to be routed to a contact center agent, determining, for each agent cohort of a plurality of agent cohorts in sequential order and for a cohort time period associated with the respective agent cohort, whether a contact center agent within the respective cohort is available to be routed the interaction, wherein the plurality of agent cohorts is in sequential order based on descending agent performance scores for at least one key performance indicator, and routing the interaction to a first contact center agent determined to be available to be routed the interaction.

In some embodiments, determining, for each agent cohort of the plurality of agent cohorts in sequential order and for a cohort time period associated with the respective agent cohort, whether a contact center agent within the respective cohort is available to be routed the interaction may include determining, within a first cohort time period, whether a contact center agent within a first agent cohort is available to be routed the interaction, wherein the first agent cohort includes contact center agents having agent performance scores within a first range, and determining, within a second cohort time period following the first cohort time period and in response to determining that the interaction is unable to be routed to a contact center agent within the first agent cohort within the first cohort time period, whether a contact center agent within the first agent cohort or a second agent cohort is available to be routed the interaction, wherein the second agent cohort includes contact center agents having agent performance scores within a second range of scores lesser than the first range of scores.

In some embodiments, the first cohort time period may be different from the second cohort time period.

In some embodiments, the first range may be of a different size than the second range.

In some embodiments, the method may further include performing fallback automatic call distribution routing in response to determining that the interaction is unable to be routed to an agent within one of the plurality of agent cohorts within a total timeout period.

According to another embodiment, a computing system for adaptive predictive routing in a contact center system may include at least one processor and at least one memory comprising a plurality of instructions stored thereon that, in response to execution by the at least one processor, causes the computing system to identify an interaction to be routed to a contact center agent, determine, for each agent cohort of a plurality of agent cohorts in sequential order and for a cohort time period associated with the respective agent cohort, whether a contact center agent within the respective cohort is available to be routed the interaction, wherein the plurality of agent cohorts is in sequential order based on descending agent performance scores for at least one key performance indicator, and route the interaction to a first contact center agent determined to be available to be routed the interaction.

In some embodiments, to determine, for each agent cohort of the plurality of agent cohorts in sequential order and for a cohort time period associated with the respective agent cohort, whether a contact center agent within the respective cohort is available to be routed the interaction may include to determine, within a first cohort time period, whether a contact center agent within a first agent cohort is available to be routed the interaction, wherein the first agent cohort includes contact center agents having agent performance scores within a first range, and determine, within a second cohort time period following the first cohort time period and in response to a determination that the interaction is unable to be routed to a contact center agent within the first agent cohort within the first cohort time period, whether a contact center agent within a second agent cohort is available to be routed the interaction, wherein the second agent cohort includes contact center agents having agent performance scores within a second range of scores lesser than the first range of scores.

In some embodiments, the first cohort time period may be different from the second cohort time period.

In some embodiments, the first range may be of a different size than the second range.

In some embodiments, the plurality of instructions may further cause the computing system to perform fallback automatic call distribution routing in response to a determination that the interaction is unable to be routed to an agent within one of the plurality of agent cohorts within a total timeout period.

According to yet another embodiment, a method for adaptive predictive routing in a contact center system may include receiving a distribution of normalized agent scores associated with a key performance indicator, wherein the normalized agent scores are associated with historical agent interactions, determining respective boundaries for each of a plurality of agent cohorts, wherein the plurality of agent cohorts is defined based on the normalized agent scores, estimating a probability density function of the distribution of normalized agent scores, calculating a percentage of agent scores within each agent cohort of the plurality of agent cohorts based on the estimated probability density function, and assigning a respective cohort timeout period to each agent cohort of the plurality of agent cohorts based on the percentage of agent scores within that agent cohort and a total timeout period.

In some embodiments, the method may further include determining the total timeout period based on the distribution of normalized agent scores.

In some embodiments, the total timeout period may be an average wait time encountered during the historical agent interactions.

In some embodiments, the total timeout period may be a time required to address at least a threshold percentage of interaction volume based on the historical agent interactions.

In some embodiments, estimating the probability density function of the distribution of normalized agent scores may include applying kernel density estimation to the distribution of normalized agent scores.

In some embodiments, estimating the probability density function may include determining a cumulative distribution function for the distribution of normalized agent scores.

In some embodiments, the respective boundaries may be associated with percentiles of the normalized agent scores for the key performance indicator.

In some embodiments, determining the respective boundaries for each of the plurality of agent cohorts may include determining whether the distribution of normalized agent scores has a pattern defined by one of a normal distribution between extremes, a uniform distribution between extremes, or a set of scattered normalized agent scores between extremes.

In some embodiments, the plurality of agent cohorts may be or include five agent cohorts.

In some embodiments, the total timeout period may be thirty seconds.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
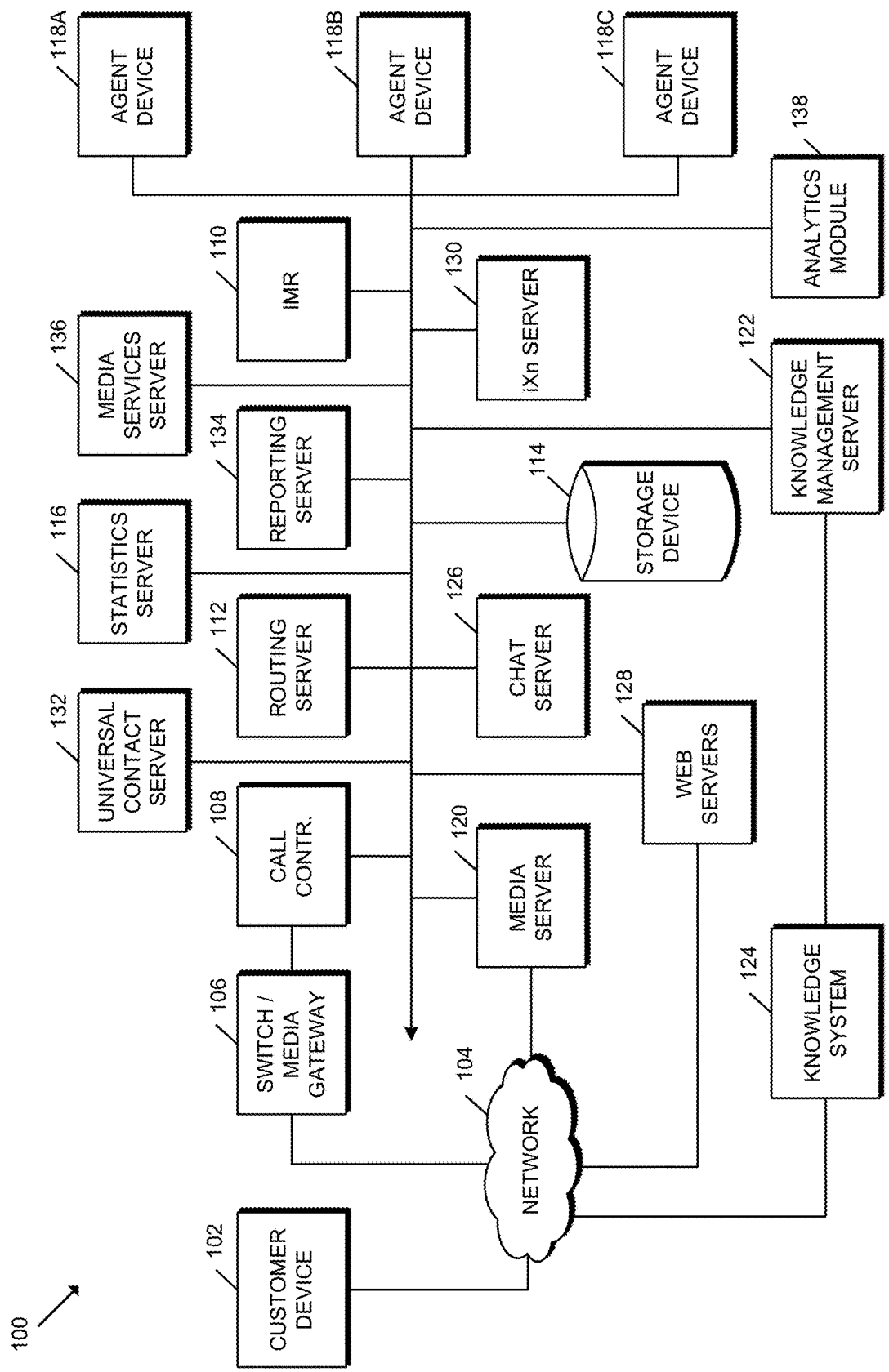
FIG. 1 depicts a simplified block diagram of at least one embodiment of a contact center system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

As described in greater detail below, it should be appreciated that predictive routing solutions may be used to target contact center agents (e.g., for routing) to handle interactions in contact centers, and therefore it may be important to make decisions regarding various factors such as how long the automatic call/interaction distribution system can wait for the predictive routing solution to find an agent to maximize its use while minimizing the impact on wait time and abandon rate, and how the predictive routing solution can be configured to maximize a key performance indicator (KPI) benefit while adapting to the availability of agents and their predictive scores. The technologies described herein leverage predictive analytics to determine the best timeout configuration and dynamic configuration of agent cohorts (e.g., "rings") to target different groups of agents under respective time constraints.

The computing system may determine how much time (e.g., the timeout period) the automatic call distribution (ACD) routine should delay assigning an interaction using traditional mechanisms in an effort of assigning a more optimal agent than may currently be available using predictive routing. After timeout of the predictive routing solution (i.e., if/when an optimal agent is not identified for routing), the computing system may resort to a fallback routing method. For example, in various embodiments, the fallback routing method may not focus on the optimization of a key performance indication of the contact center, and instead may be based on agent availability, idle time, and/or other non-KPI criteria. It should be appreciated that the computing system may analyze historical contact center interaction data to determine the best timeout configuration so that a desired percentage of interactions is handled by the predictive routing solution rather than a fallback solution.

Additionally, the computing system may group the contact center agents into agent cohorts such that the "best" agents are targeted first for routing of the interaction. It should be appreciated that the agents deemed to be the "best" may be relative to various factors such as, for example, intent, time and date, occupancy, recent historical data, and/or other factors. In some embodiments, the computing system may be configured such that it is seen as a negative feature to always select the "top" agents for routing to keep them busy while other agents are dismissed and less occupied. Each group/cohort may also have a respective timeout period such that, after the timeout period is reached, the next group/cohort is then targeted for routing of the interaction. For example, in an embodiment, the agent cohorts may be arranged using "rings" in a bullseye configuration. In particular, assuming predictive scores in the range of 0 to 100, the most inner ring/cohort may include agents with scores between 90 and 100, the second most inner ring/cohort may include agents with scores between 80 and 90, the third most inner ring/cohort may include agents with scores between 70 and 80, the fourth most inner ring/cohort may include agents with scores between 60 and 70, the fifth most inner ring/cohort may include agents with scores between 30 and 60, and the sixth/final most inner ring/cohort may be a default ring that leverages the fallback routing method. Further, each ring/cohort may be assigned a respective cohort timeout period, which in some embodiments may be an equal portion of the overall predictive routing solution timeout period. For example, if the total timeout period is 30 seconds, each of the ring/cohort timeout periods for the five non-fallback rings/cohorts may be 6 seconds. As time passes, agents with lower scores are targeted and the benefit of predictive routing is diminished. Accordingly, the computing system may analyze the historical distribution of agent scores for predicting routing solutions as described herein to determine the best timeout configuration of rings/cohorts.

Referring now to FIG. 1, a simplified block diagram of at least one embodiment of a communications infrastructure and/or contact center system, which may be used in conjunction with one or more of the embodiments described herein, is shown. The contact center system 100 may be embodied as any system capable of providing contact center services (e.g., call center services, chat center services, SMS center services, etc.) to an end user and otherwise performing the functions described herein. The illustrative contact center system 100 includes a customer device 102, a network 104, a switch/media gateway 106, a call controller 108, an interactive media response (IMR) server 110, a routing server 112, a storage device 114, a statistics server 116, agent devices 118A, 118B, 118C, a media server 120, a knowledge management server 122, a knowledge system 124, chat server 126, web servers 128, an interaction (iXn) server 130, a universal contact server 132, a reporting server 134, a media services server 136, and an analytics module 138. Although only one customer device 102, one network 104, one switch/media gateway 106, one call controller 108, one IMR server 110, one routing server 112, one storage device 114, one statistics server 116, one media server 120, one knowledge management server 122, one knowledge system 124, one chat server 126, one iXn server 130, one universal contact server 132, one reporting server 134, one media services server 136, and one analytics module 138 are shown in the illustrative embodiment of FIG. 1, the contact center system 100 may include multiple customer devices 102, networks 104, switch/media gateways 106, call controllers 108, IMR servers 110, routing servers 112, storage devices 114, statistics servers 116, media servers 120, knowledge management servers 122, knowledge systems 124, chat servers 126, iXn servers 130, universal contact servers 132, reporting servers 134, media services servers 136, and/or analytics modules 138 in other embodiments. Further, in some embodiments, one or more of the components described herein may be excluded from the system 100, one or more of the components described as being independent may form a portion of another component, and/or one or more of the component described as forming a portion of another component may be independent.

It should be understood that the term "contact center system" is used herein to refer to the system depicted in FIG. 1 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 100), the associated customer service provider (such as a particular customer service provider/agent providing customer services through the contact center system 100), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals," "customers," or "contact center clients"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VOIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 100 may be used by a customer service provider to provide various types of services to customers. For example, the contact center system 100 may be used to engage and manage interactions in which automated processes (or bots) or human agents communicate with customers. As should be understood, the contact center system 100 may be an in-house facility to a business or enterprise for performing the functions of sales and customer service relative to products and services available through the enterprise. In another embodiment, the contact center system 100 may be operated by a third-party service provider that contracts to provide services for another organization. Further, the contact center system 100 may be deployed on equipment dedicated to the enterprise or third-party service provider, and/or deployed in a remote computing environment such as, for example, a private or public cloud environment with infrastructure for supporting multiple contact centers for multiple enterprises. The contact center system 100 may include software applications or programs, which may be executed on premises or remotely or some combination thereof. It should further be appreciated that the various components of the contact center system 100 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 200, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

Figure 2:
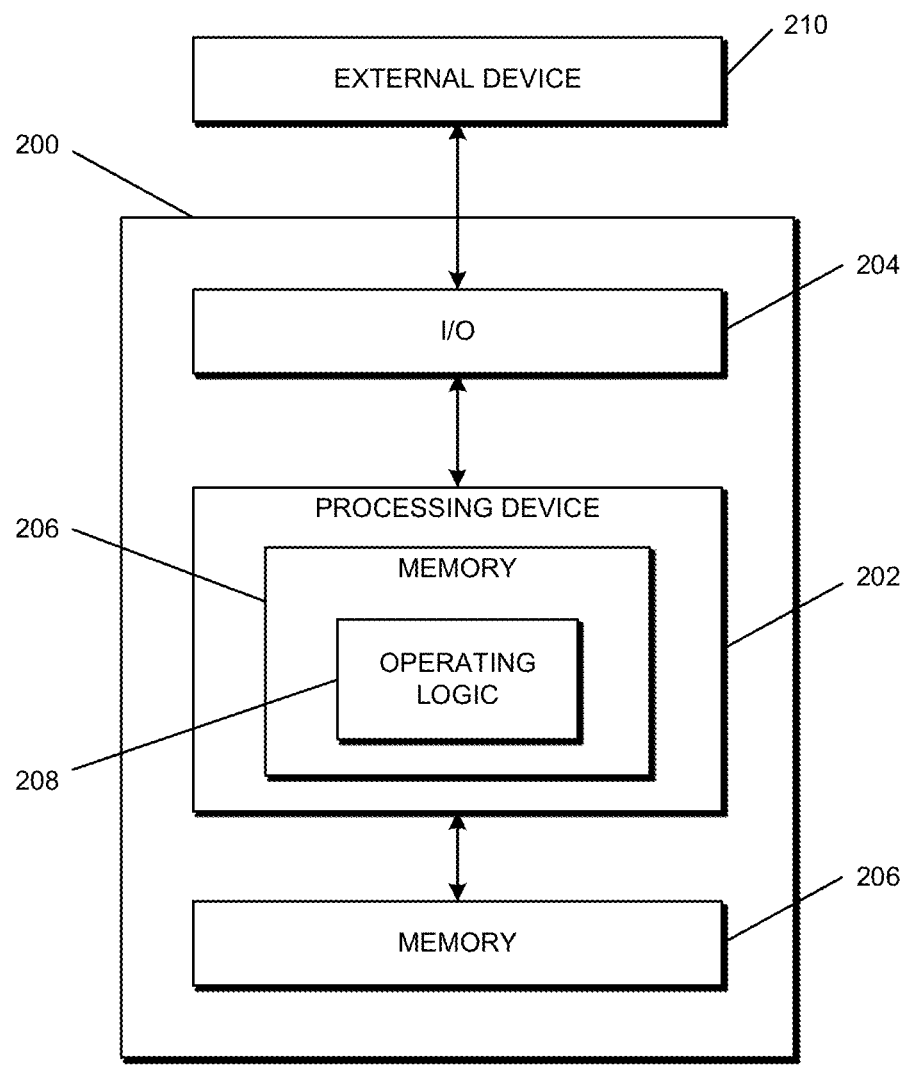
FIG. 2 is a simplified block diagram of at least one embodiment of a computing device.

It should be understood that any of the computer-implemented components, modules, or servers described in relation to FIG. 1 may be implemented via one or more types of computing devices, such as, for example, the computing device 200 of FIG. 2. As will be seen, the contact center system 100 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 100 may initiate inbound communications (e.g., telephone calls, emails, chats, etc.) to the contact center system 100 via a customer device 102. While FIG. 1 shows one such customer device—i.e., customer device 102—it should be understood that any number of customer devices 102 may be present. The customer devices 102, for example, may be a communication device, such as a telephone, smart phone, computer, tablet, or laptop. In accordance with functionality described herein, customers may generally use the customer devices 102 to initiate, manage, and conduct communications with the contact center system 100, such as telephone calls, emails, chats, text messages, web-browsing sessions, and other multi-media transactions.

Inbound and outbound communications from and to the customer devices 102 may traverse the network 104, with the nature of the network typically depending on the type of customer device being used and the form of communication. As an example, the network 104 may include a communication network of telephone, cellular, and/or data services. The network 104 may be a private or public switched telephone network (PSTN), local area network (LAN), private wide area network (WAN), and/or public WAN such as the Internet. Further, the network 104 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 106 may be coupled to the network 104 for receiving and transmitting telephone calls between customers and the contact center system 100. The switch/media gateway 106 may include a telephone or communication switch configured to function as a central switch for agent level routing within the center. The switch may be a hardware switching system or implemented via software. For example, the switch 106 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 118. Thus, in general, the switch/media gateway 106 establishes a voice connection between the customer and the agent by establishing a connection between the customer device 102 and agent device 118.

As further shown, the switch/media gateway 106 may be coupled to the call controller 108 which, for example, serves as an adapter or interface between the switch and the other routing, monitoring, and communication-handling components of the contact center system 100. The call controller 108 may be configured to process PSTN calls, VOIP calls, and/or other types of calls. For example, the call controller 108 may include computer-telephone integration (CTI) software for interfacing with the switch/media gateway and other components. The call controller 108 may include a session initiation protocol (SIP) server for processing SIP calls. The call controller 108 may also extract data about an incoming interaction, such as the customer's telephone number, IP address, or email address, and then communicate these with other contact center components in processing the interaction.

The interactive media response (IMR) server 110 may be configured to enable self-help or virtual assistant functionality. Specifically, the IMR server 110 may be similar to an interactive voice response (IVR) server, except that the IMR server 110 is not restricted to voice and may also cover a variety of media channels. In an example illustrating voice, the IMR server 110 may be configured with an IMR script for querying customers on their needs. For example, a contact center for a bank may instruct customers via the IMR script to "press 1" if they wish to retrieve their account balance. Through continued interaction with the IMR server 110, customers may receive service without needing to speak with an agent. The IMR server 110 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment.

The routing server 112 may function to route incoming interactions. For example, once it is determined that an inbound communication should be handled by a human agent, functionality within the routing server 112 may select the most appropriate agent and route the communication thereto. This agent selection may be based on which available agent is best suited for handling the communication. More specifically, the selection of appropriate agent may be based on a routing strategy or algorithm that is implemented by the routing server 112. In doing this, the routing server 112 may query data that is relevant to the incoming interaction, for example, data relating to the particular customer, available agents, and the type of interaction, which, as described herein, may be stored in particular databases. Once the agent is selected, the routing server 112 may interact with the call controller 108 to route (i.e., connect) the incoming interaction to the corresponding agent device 118. As part of this connection, information about the customer may be provided to the selected agent via their agent device 118. This information is intended to enhance the service the agent is able to provide to the customer.

It should be appreciated that the contact center system 100 may include one or more mass storage devices—represented generally by the storage device 114—for storing data in one or more databases relevant to the functioning of the contact center. For example, the storage device 114 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 114 may store agent data in an agent database. Agent data maintained by the contact center system 100 may include, for example, agent availability and agent profiles, schedules, skills, handle time, and/or other relevant data. As another example, the storage device 114 may store interaction data in an interaction database. Interaction data may include, for example, data relating to numerous past interactions between customers and contact centers. More generally, it should be understood that, unless otherwise specified, the storage device 114 may be configured to include databases and/or store data related to any of the types of information described herein, with those databases and/or data being accessible to the other modules or servers of the contact center system 100 in ways that facilitate the functionality described herein. For example, the servers or modules of the contact center system 100 may query such databases to retrieve data stored therein or transmit data thereto for storage. The storage device 114, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 116 may be configured to record and aggregate data relating to the performance and operational aspects of the contact center system 100. Such information may be compiled by the statistics server 116 and made available to other servers and modules, such as the reporting server 134, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 118 of the contact center system 100 may be communication devices configured to interact with the various components and modules of the contact center system 100 in ways that facilitate functionality described herein. An agent device 118, for example, may include a telephone adapted for regular telephone calls or VOIP calls. An agent device 118 may further include a computing device configured to communicate with the servers of the contact center system 100, perform data processing associated with operations, and interface with customers via voice, chat, email, and other multimedia communication mechanisms according to functionality described herein. Although FIG. 1 shows three such agent devices 118—i.e., agent devices 118A, 118B and 118C—it should be understood that any number of agent devices 118 may be present in a particular embodiment.

The multimedia/social media server 120 may be configured to facilitate media interactions (other than voice) with the customer devices 102 and/or the servers 128. Such media interactions may be related, for example, to email, voice mail, chat, video, text-messaging, web, social media, co-browsing, etc. The multimedia/social media server 120 may take the form of any IP router conventional in the art with specialized hardware and software for receiving, processing, and forwarding multi-media events and communications.

The knowledge management server 122 may be configured to facilitate interactions between customers and the knowledge system 124. In general, the knowledge system 124 may be a computer system capable of receiving questions or queries and providing answers in response. The knowledge system 124 may be included as part of the contact center system 100 or operated remotely by a third party. The knowledge system 124 may include an artificially intelligent computer system capable of answering questions posed in natural language by retrieving information from information sources such as encyclopedias, dictionaries, newswire articles, literary works, or other documents submitted to the knowledge system 124 as reference materials. As an example, the knowledge system 124 may be embodied as IBM Watson or a similar system.

The chat server 126, it may be configured to conduct, orchestrate, and manage electronic chat communications with customers. In general, the chat server 126 is configured to implement and maintain chat conversations and generate chat transcripts. Such chat communications may be conducted by the chat server 126 in such a way that a customer communicates with automated chatbots, human agents, or both. In exemplary embodiments, the chat server 126 may perform as a chat orchestration server that dispatches chat conversations among the chatbots and available human agents. In such cases, the processing logic of the chat server 126 may be rules driven so to leverage an intelligent workload distribution among available chat resources. The chat server 126 further may implement, manage, and facilitate user interfaces (UIs) associated with the chat feature, including those UIs generated at either the customer device 102 or the agent device 118. The chat server 126 may be configured to transfer chats within a single chat session with a particular customer between automated and human sources such that, for example, a chat session transfers from a chatbot to a human agent or from a human agent to a chatbot. The chat server 126 may also be coupled to the knowledge management server 122 and the knowledge systems 124 for receiving suggestions and answers to queries posed by customers during a chat so that, for example, links to relevant articles can be provided.

The web servers 128 may be included to provide site hosts for a variety of social interaction sites to which customers subscribe, such as Facebook, Twitter, Instagram, etc. Though depicted as part of the contact center system 100, it should be understood that the web servers 128 may be provided by third parties and/or maintained remotely. The web servers 128 may also provide webpages for the enterprise or organization being supported by the contact center system 100. For example, customers may browse the webpages and receive information about the products and services of a particular enterprise. Within such enterprise webpages, mechanisms may be provided for initiating an interaction with the contact center system 100, for example, via web chat, voice, or email. An example of such a mechanism is a widget, which can be deployed on the webpages or websites hosted on the web servers 128. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 130 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 130 may be configured to interact with the routing server 112 for selecting an appropriate agent to handle each of the deferrable activities. Once assigned to a particular agent, the deferrable activity is pushed to that agent so that it appears on the agent device 118 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 118 may include a workbin. As an example, a workbin may be maintained in the buffer memory of the corresponding agent device 118.

The universal contact server (UCS) 132 may be configured to retrieve information stored in the customer database and/or transmit information thereto for storage therein. For example, the UCS 132 may be utilized as part of the chat feature to facilitate maintaining a history on how chats with a particular customer were handled, which then may be used as a reference for how future chats should be handled. More generally, the UCS 132 may be configured to facilitate maintaining a history of customer preferences, such as preferred media channels and best times to contact. To do this, the UCS 132 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 134 may be configured to generate reports from data compiled and aggregated by the statistics server 116 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 136 may be configured to provide audio and/or video services to support contact center features. In accordance with functionality described herein, such features may include prompts for an IVR or IMR system (e.g., playback of audio files), hold music, voice-mails/single party recordings, multi-party recordings (e.g., of audio and/or video calls), screen recording, speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 138 may be configured to provide systems and methods for performing analytics on data received from a plurality of different data sources as functionality described herein may require. In accordance with example embodiments, the analytics module 138 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 138 may have access to the data stored in the storage device 114, including the customer database and agent database. The analytics module 138 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 138 may be configured to retrieve data stored within the storage device 114 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 138 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 138 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 1 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VOIP calls), emails, vmails, video, chat, screen-sharing, text messages, social media messages, WebRTC calls, etc. Access to and control of the components of the contact center system 100 may be affected through user interfaces (UIs) which may be generated on the customer devices 102 and/or the agent devices 118.

As noted above, in some embodiments, the contact center system 100 may operate as a hybrid system in which some or all components are hosted remotely, such as in a cloud-based or cloud computing environment. It should be appreciated that each of the devices of the contact center system 100 may be embodied as, include, or form a portion of one or more computing devices similar to the computing device 200 described below in reference to FIG. 2.

Referring now to FIG. 2, a simplified block diagram of at least one embodiment of a computing device 200 is shown. The illustrative computing device 200 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 200, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 100 of FIG. 1—the various servers and computer devices thereof may be located on local computing devices 200 (e.g., on-site at the same physical location as the agents of the contact center), remote computing devices 200 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 200 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as one or more of the devices/systems described herein, and/or a portion thereof. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

The computing device 200 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 200 may communicate with other computing devices 200 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 200 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Figure 3:
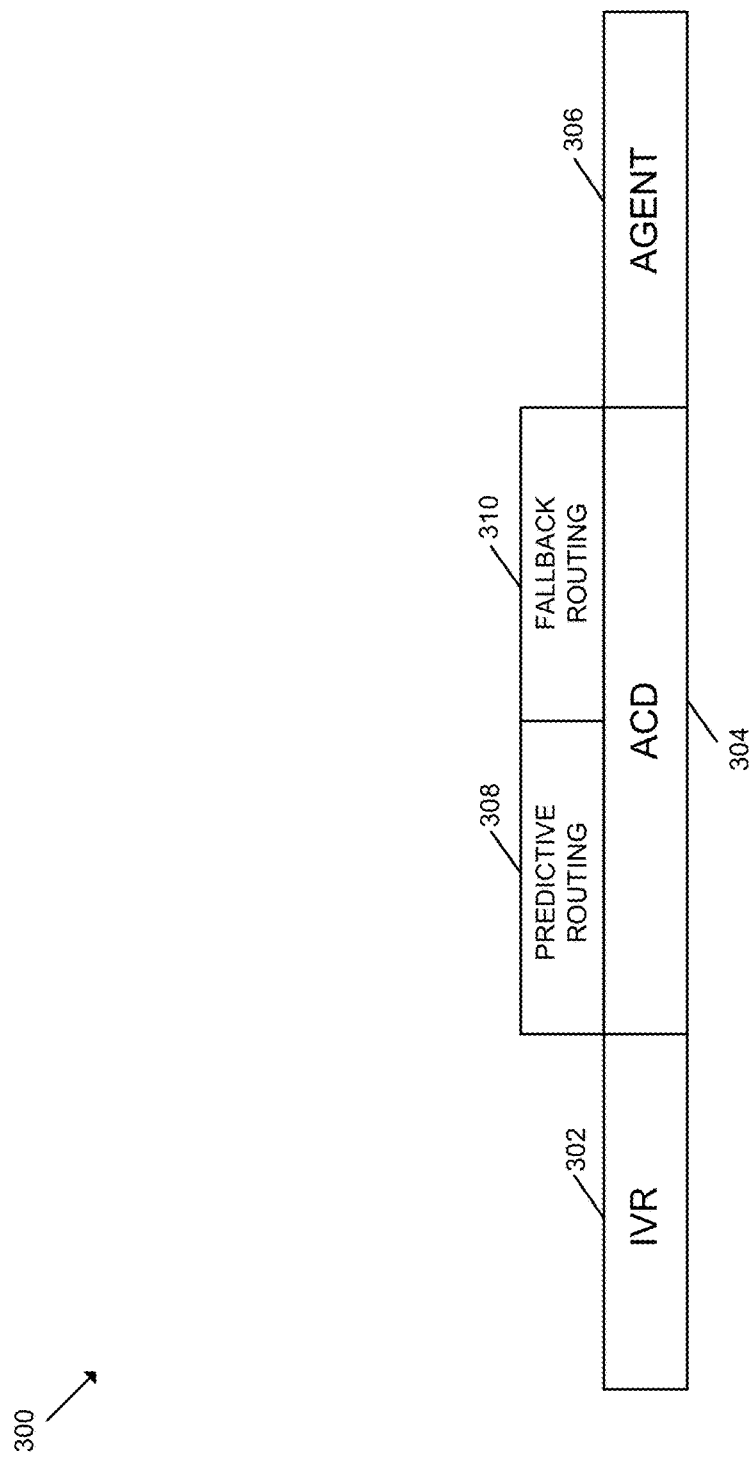
FIG. 3 is a simplified model of automatic call distribution within a contact center system.

Referring now to FIG. 3, a simplified model 300 of automatic call distribution within a contact center system (e.g., the contact center system 100) is shown. In the illustrative model, an interaction between a user and the contact center system arrives and enters, for example, the interactive voice response system (IVR) 302 of the contact center system. The interaction is then transferred to the automatic call distribution (ACD) 304 system for routing of the interaction to an agent 306 available to interact with the user. As depicted, the ACD 304 may include two solutions in the illustrative model 300—predictive routing 308 and fallback routing 310. As described herein, predictive routing 308 may be used to find the best agent with the best chances to optimize a particular KPI within a timeout period (e.g., thirty seconds). If for some reason no agent is routed the interaction within that timeout period, a fallback routing method may be applied (e.g., first-in, first-out).

Figure 4:
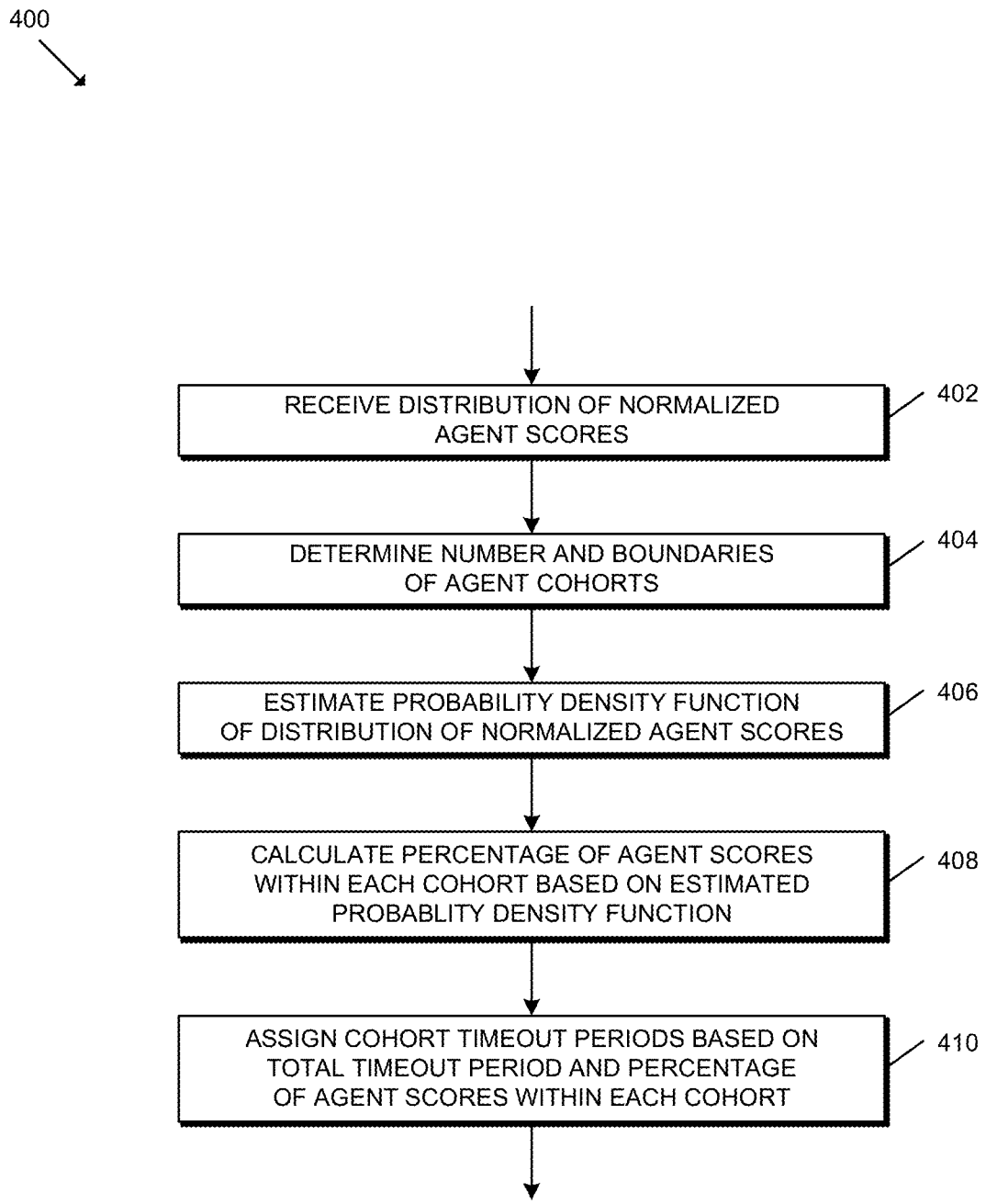
FIG. 4 is a simplified flow diagram of at least one embodiment of a method for determining an agent cohort configuration.

Referring now to FIG. 4, in use, a computing system (e.g., the contact center system 100 and/or computing device 200) may execute a method 400 for determining an agent cohort configuration. It should be appreciated that the particular blocks of the method 400 are illustrated by way of example, and such blocks may be combined or divided, added or removed, and/or reordered in whole or in part depending on the particular embodiment, unless stated to the contrary.

Figure 7:
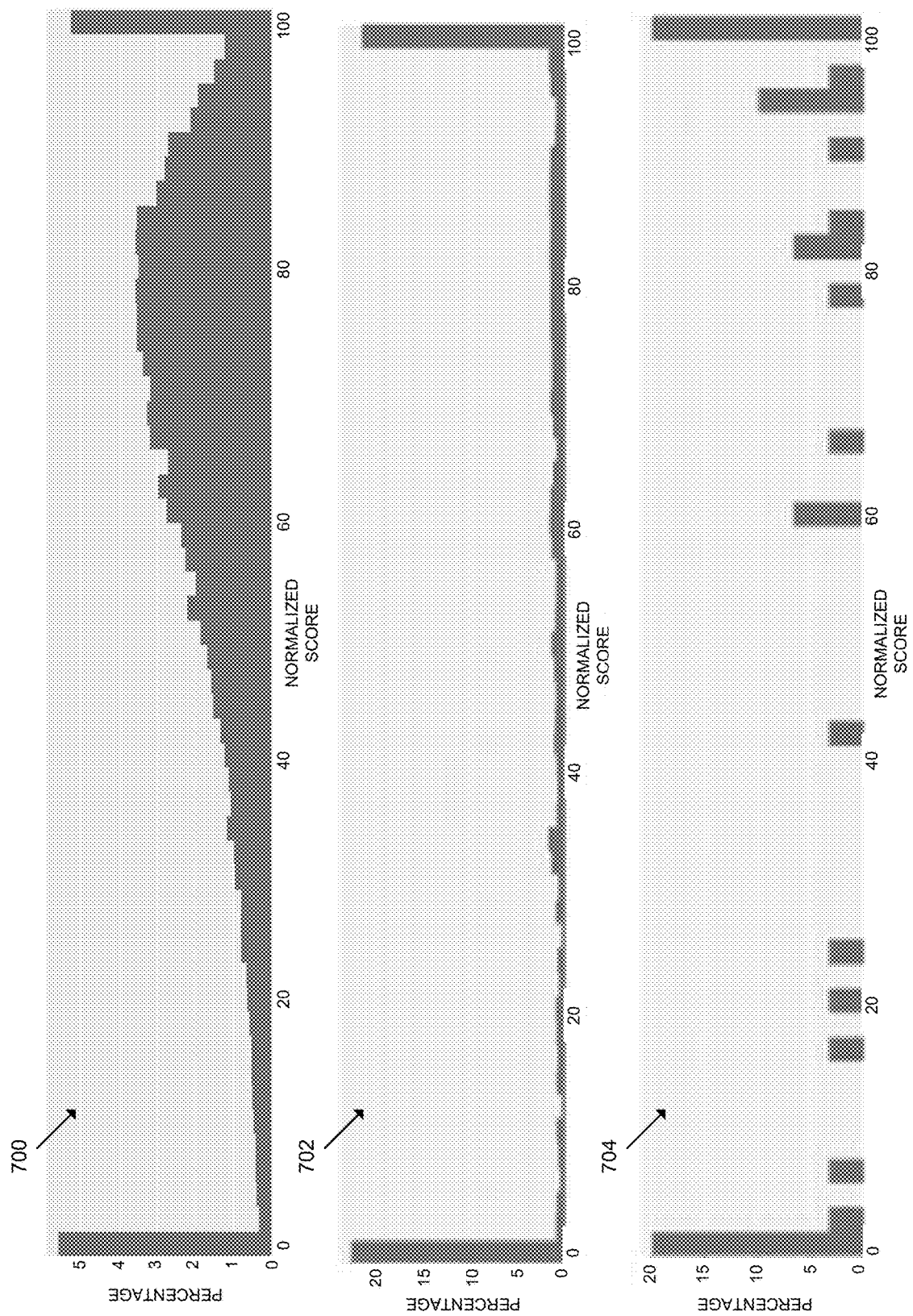
FIG. 7 illustrates various example distributions of normalized agent scores.

The illustrative method 400 begins with block 402 in which the computing system receives a distribution of normalized agent scores associated with a key performance indicator. It should be appreciated that the normalized agent scores may be associated with historical agent interactions. For example, FIG. 7 illustrates various example distributions of normalized agent scores (e.g., normalized between 0 and 100). In particular, the illustrative examples include a distribution 700 that has a pattern defined by a normal distribution (or left/right skewed normal distribution) between extremes (e.g., relatively high scores at 0 and 100), a distribution 702 that has a pattern defined by a uniform distribution (or approximately uniform) between extremes, and a distribution 704 that has a pattern defined by a set of scattered scores between extremes. In some embodiments, the KPI being optimized may be, for example, average handle time (AHT) of the agent, customer satisfaction (CSAT), next contact avoidance (NCA), number of transfers, net promoter score (NPS), case resolution time (CRT), sales conversion, sales revenue, average wait time (AWT), first call resolution (FCR), and/or another KPI.

In block 404, the computing system determines the number and boundaries of the agent cohorts to be used for predictive routing based on the normalized agent scores. In other words, the computing system may determine an agent cohort configuration for predictive routing. It should be appreciated that the respective boundaries of the agent cohorts are associated with percentiles of the normalized agent scores for the relevant KPI. In some embodiments, the default total number of rings/cohorts may be five, the default total timeout period may be thirty seconds, and/or the total timeout period may be evenly divided across the cohorts/rings for the cohort-specific time periods by default. Further, in some embodiments, the default boundaries may be similar to those described below in reference to FIG. 8 (e.g., 90-100, 80-90, 70-80, 60-70, 30-60, and 0-30).

Figure 8:
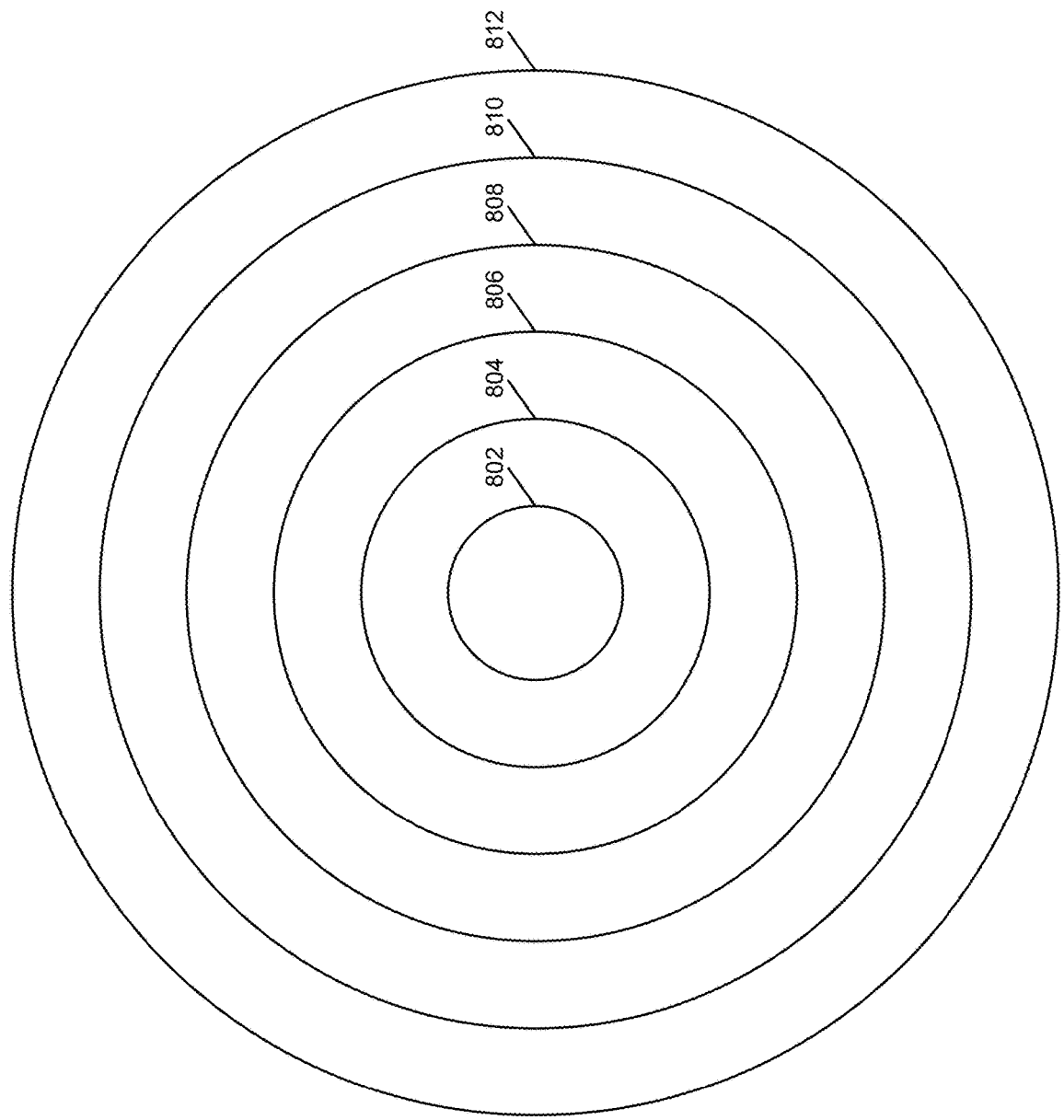
FIG. 8 is a simplified diagram of at least one example agent cohort configuration.

At least one example of an agent cohort configuration 800 is depicted in FIG. 8 as a set of concentric rings. In the illustrative embodiment, a first ring/cohort 802 is associated with agent scores between 90 and 100 and a cohort wait time of six seconds, a second ring/cohort 804 is associated with agent scores between 80 and 90 and a cohort wait time of six seconds, a third ring/cohort 806 is associated with agent scores between 70 and 80 and a cohort wait time of six seconds, a fourth ring/cohort 808 is associated with agent scores between 60 and 70 and a cohort wait time of six seconds, a fifth ring/cohort 810 is associated with agent scores between 30 and 60 and a cohort wait time of six seconds, and a sixth ring/cohort 812 is associated with agent scores between 0 and 30 and a default ring/cohort.

However, it should be appreciated that the agent cohort configuration 800 is described for illustrative purposes, and the number and boundaries of agent cohorts may vary depending on the particular embodiments and/or circumstances. For example, in some embodiments, the computing system may determine the number agent cohorts and/or the boundaries of the agent cohorts by comparing the shape or pattern of the distribution of normalized agent scores to a predefined set of distribution shapes/patterns, each of which may be associated with a predefined number of agent cohorts and/or predefined agent score boundaries. The range/boundaries of each agent cohort and/or associated cohort time period may vary depending on the particular embodiment. More specifically, in some embodiments, the computing system may determine whether the distribution of normalized agent scores has a pattern defined by a normal distribution between two extremes (e.g., similar to the distribution 700 of FIG. 7), a uniform distribution between extremes (e.g., similar to the distribution 702 of FIG. 7), or a set of scattered normalized agent scores between extremes (e.g., similar to the distribution 704 of FIG. 7). In another embodiments, the number of rings/cohorts in an agent cohort configuration may depend on the cardinality of skill combinations that exist within an agent queue.

Referring now to FIG. 7, the illustrative distribution 700 has a shape or pattern representative of a normal distribution (or side-biased version thereof) between extreme values at 0 and 100. For example, assuming default ring boundaries, approximately 15-20% of the agent scores would fall within the first ring for the distribution 700, and the default parameters described above may be appropriate for such a distribution. However, in some embodiments, the computing system may modify the number/boundaries in establishing an agent cohort configuration for a distribution with a pattern similar to the distribution 700, for example, by increasing the wait times in the first ring, decreasing the wait times in the last ring, decreasing the number of rings (e.g., by merging the first two rings), increasing the threshold of the last ring, and/or assigning wait times incrementally prioritizing agents with better scores. For example, in an embodiment, the computing system may maintain the same boundaries as the default configuration but change the cohort time period for the first cohort to eight seconds with a commensurate decrease of the time period for the last cohort to four seconds. In another embodiment, the computing system may reduce the number of cohorts from five to four by merging the first two cohorts and eliminating the last cohort or portion thereof (e.g., resulting in cohort boundaries of 80-100, 70-80, 60-70, and 50-60), and the corresponding cohort time periods may be twelve seconds for the first cohort, eight seconds for the second cohort, six seconds for the third cohort, and four seconds for the fourth/last cohort.

The illustrative distribution 702 has a shape or pattern representative of a uniform distribution (e.g., not necessarily perfectly uniform) between extreme values at 0 and 100. Assuming default ring boundaries, approximately 20-25% of the agent scores would fall within each of the first ring and the last ring for the distribution 702 with the remainder distributed approximately evenly between the extremes. In some embodiments, the computing system may modify the number/boundaries in establishing an agent cohort configuration for a distribution with a pattern similar to the distribution 702, for example, by increasing the wait times for the first ring and have uniform wait times in other rings. For example, in an embodiment, the computing system may maintain the same boundaries as the default configuration but increase the cohort time period for the first cohort to twelve seconds.

The illustrative distribution 704 has a shape or pattern representative of a set of scattered normalized agent scores between extreme values at 0 and 100. For example, such queues may be associated with few agents associated with them. In some embodiments, the computing system may modify the number/boundaries in establishing an agent cohort configuration for a distribution with a pattern similar to the distribution 704, for example, by reducing the number of rings, widening the size of the rings, and/or increasing the wait time associated with the first ring. In particular, in an embodiment, the computing system may reduce the number of rings from five to three with adjusted boundaries (e.g., 80-100, 60-80, and 40-60), and the corresponding cohort time periods may be fourteen seconds for the first cohort, eight seconds for the second cohort, and eight seconds for the third/last cohort.

Referring back to FIG. 4, in block 406, the computing system estimates the probability density function of the distribution of normalized agent scores. In some embodiments, the computing system may apply kernel density estimation to the distribution of normalized agent scores in order to estimate the probability density function of that distribution. However, it should be appreciated that the computing system may leverage another algorithm or technology to determine or estimate the probability density function in other embodiments. Further, in another embodiment, the computing system may determine or estimate the cumulative distribution function instead of the probability density function, and therefore rely on the cumulative distribution function to perform functions similar to those described herein instead.

Figure 9:
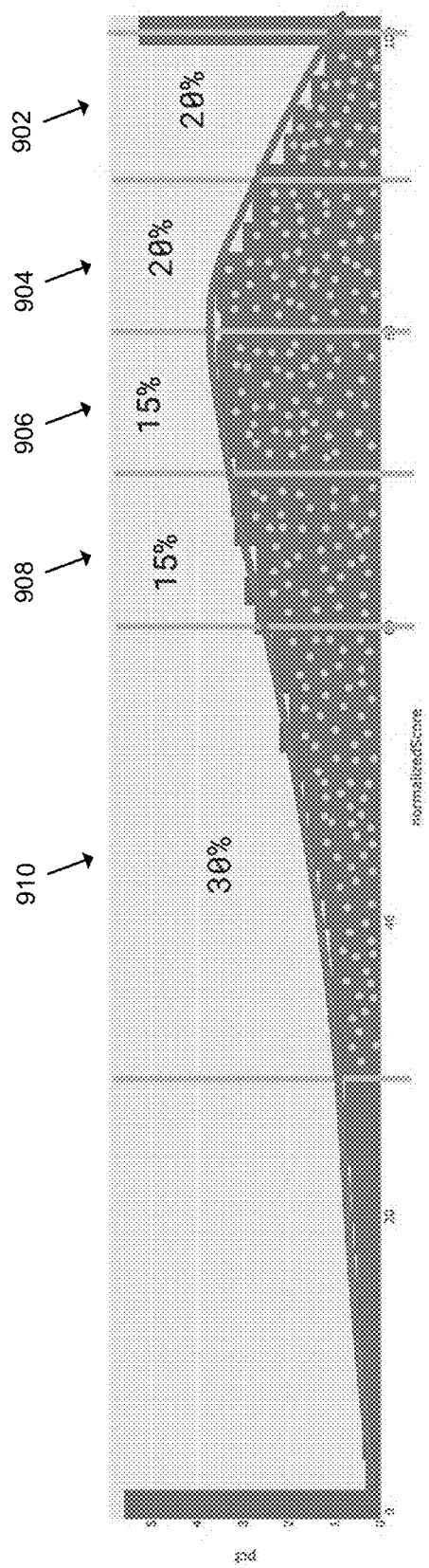
FIG. 9 illustrates an agent cohort configuration associated with an example distribution of normalized agent scores.

In block 408, the computing system calculates the percentage of agent scores within each agent cohort based on the estimated probability density function. For example, in some embodiments, the computing system may calculate the area under the curve (i.e., of the estimated probability density function) within the ring/cohort (e.g., between the boundaries), and determine the percentage of that area relative to the total area under the curve (or total area under the curve that is associated with the defined rings/cohorts). In embodiments in which a cumulative distribution function is employed, the computing system may subtract the value associated with the lower boundary of the ring/cohort from the value associated with the upper boundary of the ring/cohort. For the distribution depicted in FIG. 9, the computing system may calculate that twenty percent of agents are within the first ring/cohort 902, twenty percent of agents are within the second ring/cohort 904, fifteen percent of agents are within the third ring/cohort 906, fifteen percent of agents are within the fourth ring/cohort 908, and thirty percent of agents are within the fifth ring/cohort 910.

In block 410, the computing system assigns cohort timeout periods to each agent cohort based on the percentage of agent scores within that agent cohort and the total timeout period. In particular, in some embodiments, the computing system may utilize the percentage of agent scores within an agent cohort as a weight and multiple that weight/percentage by the total timeout period to determine the cohort time period. For example, if the total timeout period is thirty seconds, and the percentage of agent scores with a particular agent cohort is twenty percent, then the cohort time period for that particular agent cohort may be assigned six seconds (30 s*0.20=6 s).

It should be further appreciated that the total timeout period used by the computing system may vary depending on the particular embodiment. In some embodiments, the total timeout period may be a default time period (e.g., 30 seconds). In other embodiments, the total timeout period may be based on an analysis of historical agent interactions such as the distribution of normalized agent scores. In particular, in some embodiments, the total timeout period may be, or may be based on, an average wait time encountered during the historical agent interactions (e.g., limited to some maximum threshold). In other embodiments, the total timeout period may be, or may be based on, a time required to address at least a threshold percentage of interaction volume (e.g., 80%) based on the historical agent interactions (e.g., limited to some maximum threshold). In yet other embodiments, the total timeout period may be the greater of those numbers, but limited to a maximum of some threshold.

Although the blocks 402-410 are described in a relatively serial manner, it should be appreciated that various blocks of the method 400 may be performed in parallel in some embodiments.

Figure 5:
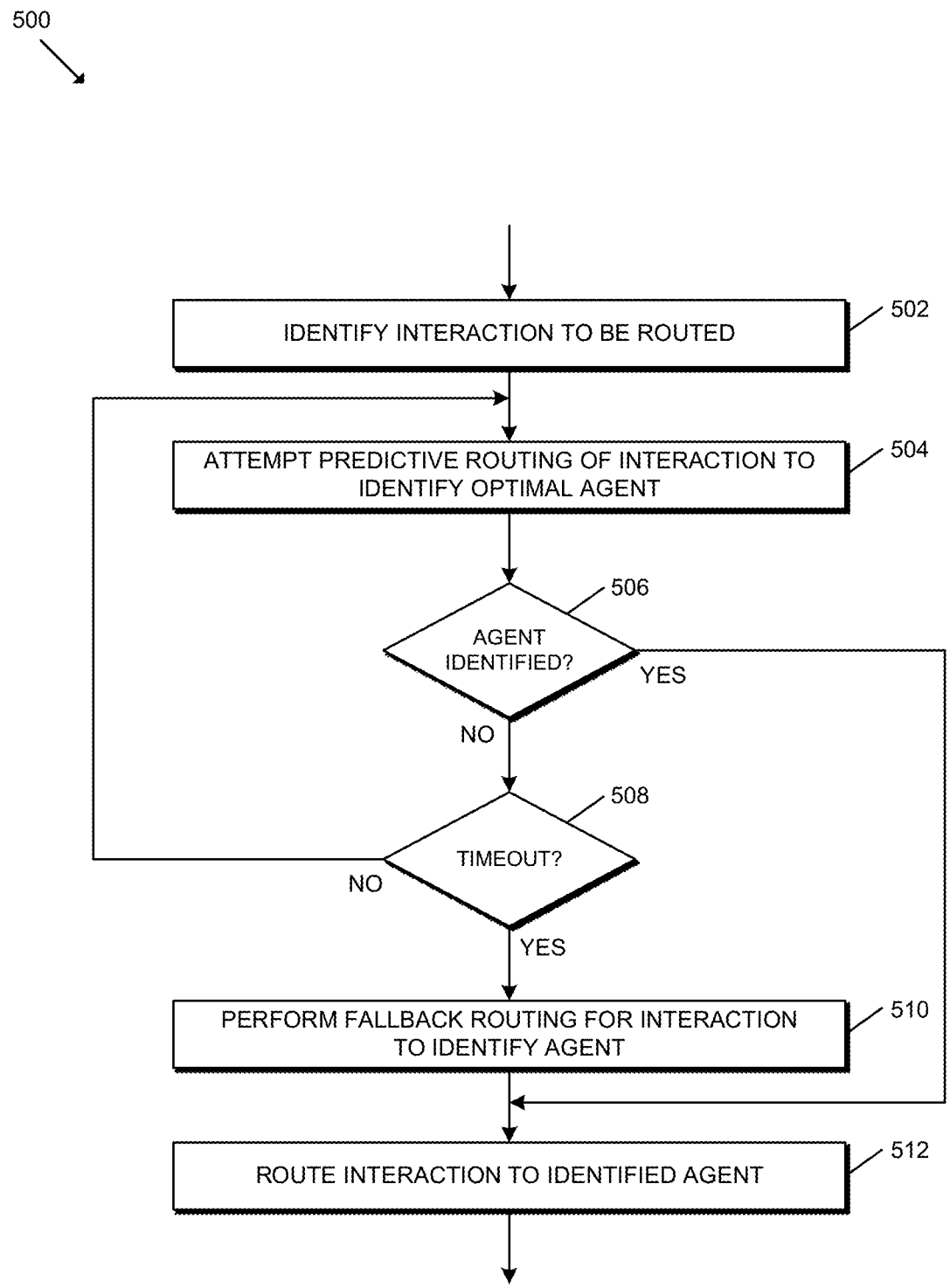
FIG. 5 is a simplified flow diagram of at least one embodiment of a method for performing adaptive predictive routing in a contact center system.

Referring now to FIG. 5, in use, a computing system (e.g., the contact center system 100 and/or computing device 200) may execute a method 500 for performing adaptive predictive routing in a contact center system. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the computing system identifies an interaction to be routed to a contact center agent. In block 504, the computing system attempts predictive routing of the interaction to identify an optimal agent. To do so, it should be appreciated that the computing system may utilize the techniques described above and/or execute the method 600 of FIG. 6 described below. If the computing system determines, in block 506, that an agent has been identified, the method 500 advances to block 512 in which the computing system routes the interaction to the identified agent. However, if the computing system determines that an agent has not been identified, the method 500 advances to block 508 in which the computing system determines whether the total timeout period has elapsed. If not, the method 500 returns to block 504 in which the computing system continues to attempt to perform predictive routing to route the interaction to an optimal agent. However, if the computing system determines that the total timeout period has elapsed in block 508, the computing system advances to block 510 in which the computing system may perform fallback routing to determine an agent to which to route the interaction. Once identified, the computing system may route the interaction to the identified agent in block 512.

Although the blocks 502-512 are described in a relatively serial manner, it should be appreciated that various blocks of the method 500 may be performed in parallel in some embodiments.

Figure 6:
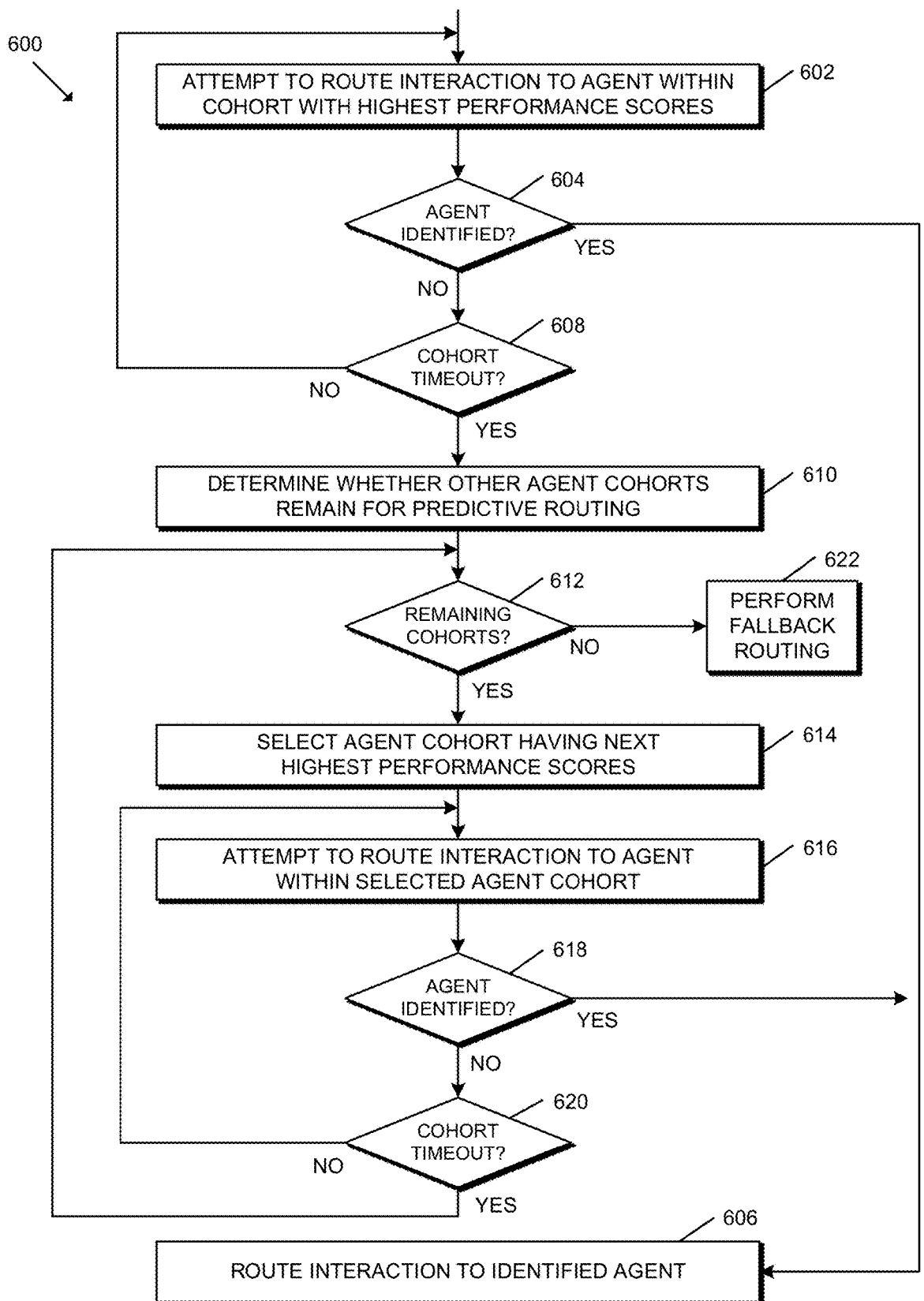
FIG. 6 is a simplified flow diagram of at least one embodiment of a method for performing adaptive predictive routing in a contact center system.

Referring now to FIG. 6, in use, a computing system (e.g., the contact center system 100 and/or computing device 200) may execute a method 600 for performing adaptive predictive routing in a contact center system. It should be appreciated that the particular blocks of the method 600 are illustrated by way of example, and such blocks may be combined or divided, added or removed, and/or reordered in whole or in part depending on the particular embodiment, unless stated to the contrary.

The illustrative method 600 begins with block 602 in which the computing system attempts to route an interaction to an agent within the agent cohort with the highest performance scores (e.g., based on the normalized agent scores for historical agent interactions). If the computing system determines, in block 604, that an agent has been identified for predictive routing of the interaction, the method 600 advances to block 606 in which the computing system routes the interaction to the identified agent. However, if the computing system determines, in block 604, that an agent has not been identified, the method 600 advances to block 608 in which the computing system determines whether the cohort time period (e.g., cohort timeout) associated with that particular agent cohort has elapsed. If not, the method 600 returns to block 602 in which the computing system continues to attempt to route the interaction to an agent within the agent cohort having the highest performance scores.

If the computing system determines, in block 608, that the cohort time period associated with the particular cohort has elapsed, the method 600 advances to block 610 in which the computing system determines whether other agent cohorts remain for predictive routing. In other words, the computing system determines whether there are any other agent cohorts for which to attempt to perform predictive routing. It should be appreciated that, in some embodiments, such features may be performed implicitly by virtue of the cohort time periods in sum totaling the total timeout period, such that if the total timeout period has not elapsed, then another agent cohort must remain. If the computing system determines, in block 612, that no agent cohorts remain (e.g., that the total timeout period has elapsed/expired), the method 600 advances to block 622 in which the computing system performs fallback routing using another technique (e.g., based on available agents, agent idle time, etc.).

However, if the computing system determines, in block 612, that one or more agent cohorts remain to process for predictive routing, the method 600 advances to block 614 in which the computing system selects the agent cohort having the next highest performance scores. For example, if the prior ring/cohort analyzed was the first ring/cohort, the next ring/cohort analyzed is the second ring/cohort, assuming the rings/cohorts are ordered based on descending agent performance scores. In block 616, the computing system attempts to route the interaction to an agent within the selected agent cohort. If the computing system determines, in block 618, that the agent has been identified for predictive routing of the interaction, the method 600 advances to block 606 in which the computing system routes the interaction to the identified agent. However, if the computing system determines, in block 618, that an agent has not been identified, the method 600 advances to block 620 in which the computing system determines whether the cohort time period (e.g., cohort timeout) associated with that particular agent cohort has elapsed. If not, the method 600 returns to block 616 in which the computing system continues to attempt to route the interaction to an agent within the selected agent cohort. However, if the computing system determines, in block 620, that the cohort time period has elapsed, the method 600 returns to block 612 in which the computing system determines whether any agent cohorts remain to process for predictive routing.

In other words, as described herein, the computing system identifies an interaction to be routed to a contact center agent, determines, for each agent cohort in sequential order and for a cohort time period associated with the respective agent cohort, whether a contact center agent within the respective cohort is available to be routed the interaction, and routes the interaction to a first contact center agent determined to be available during this predictive routing phase of automated contact/call distribution. As described above, the agent cohorts are analyzed in sequential order based on descending agent performance scores for at least one KPI. Further, it should be appreciated that, in some embodiments, when the computing system analyzes a next agent cohort for predictive routing, the computing system may continue to analyze the prior agent cohort(s) for predictive routing. For example, when predictive routing has proceeded to the second ring/cohort, the computing system may perform the analysis with respect to both the first ring/cohort and the second ring/cohort. And, in some embodiments, when predictive routing has proceeded to the third ring/cohort, the computing system may perform the analysis with respect to all of the first ring/cohort, the second right/cohort, and the third ring/cohort. If predictive routing is unsuccessful within a total timeout period, the computing system returns to a fallback routing mechanism.

Although the blocks 602-622 are described in a relatively serial manner, it should be appreciated that various blocks of the method 600 may be performed in parallel in some embodiments.

What is claimed is:

1. A method for adaptive predictive routing in a contact center system, the method comprising:
   identifying an interaction to be routed to a contact center agent;
   determining, for each agent cohort of a plurality of agent cohorts in sequential order and for a cohort time period associated with the respective agent cohort, whether a contact center agent within the respective cohort is available to be routed the interaction, wherein the plurality of agent cohorts is in sequential order based on descending agent performance scores for at least one key performance indicator; and
   routing the interaction to a first contact center agent determined to be available to be routed the interaction;
   wherein determining, for each agent cohort of the plurality of agent cohorts in sequential order and for a cohort time period associated with the respective agent cohort, whether a contact center agent within the respective cohort is available to be routed the interaction comprises:
      determining, within a first cohort time period, whether a contact center agent within a first agent cohort is available to be routed the interaction, wherein the first agent cohort includes contact center agents having agent performance scores within a first range; and
      determining, within a second cohort time period following the first cohort time period and in response to determining that the interaction is unable to be routed to a contact center agent within the first agent cohort within the first cohort time period, whether a contact center agent within a second agent cohort is available to be routed the interaction, wherein the second agent cohort includes contact center agents having agent performance scores within a second range of scores lesser than the first range of scores.

2. The method of claim 1, wherein the first cohort time period is different from the second cohort time period.

3. The method of claim 1, wherein the first range is of a different size than the second range.

4. The method of claim 1, further comprising performing fallback automatic call distribution routing in response to determining that the interaction is unable to be routed to an agent within one of the plurality of agent cohorts within a total timeout period.

5. A computing system for adaptive predictive routing in a contact center system, the computing system comprising:

at least one processor; and at least one memory comprising a plurality of instructions stored thereon that, in response to execution by the at least one processor, causes the computing system to:

identify an interaction to be routed to a contact center agent;

determine, for each agent cohort of a plurality of agent cohorts in sequential order and for a cohort time period associated with the respective agent cohort, whether a contact center agent within the respective cohort is available to be routed the interaction, wherein the plurality of agent cohorts is in sequential order based on descending agent performance scores for at least one key performance indicator; and route the interaction to a first contact center agent determined to be available to be routed the interaction;

wherein to determine, for each agent cohort of the plurality of agent cohorts in sequential order and for a cohort time period associated with the respective agent cohort, whether a contact center agent within the respective cohort is available to be routed the interaction comprises to:

determine, within a first cohort time period, whether a contact center agent within a first agent cohort is available to be routed the interaction, wherein the first agent cohort includes contact center agents having agent performance scores within a first range; and determine, within a second cohort time period following the first cohort time period and in response to a determination that the interaction is unable to be routed to a contact center agent within the first agent cohort within the first cohort time period, whether a contact center agent within the first agent cohort or a second agent cohort is available to be routed the interaction, wherein the second agent cohort includes contact center agents having agent performance scores within a second range of scores lesser than the first range of scores.

6. The computing system of claim 5, wherein the first cohort time period is different from the second cohort time period.

7. The computing system of claim 5, wherein the first range is of a different size than the second range.

8. The computing system of claim 5, wherein the plurality of instructions further causes the computing system to perform fallback automatic call distribution routing in response to a determination that the interaction is unable to be routed to an agent within one of the plurality of agent cohorts within a total timeout period.

* * * * *